March 6, 1928.
P. W. TIERNEY
1,661,741
SPEED CONTROL FOR MOTION PICTURE APPARATUS
Filed Jan. 3, 1925
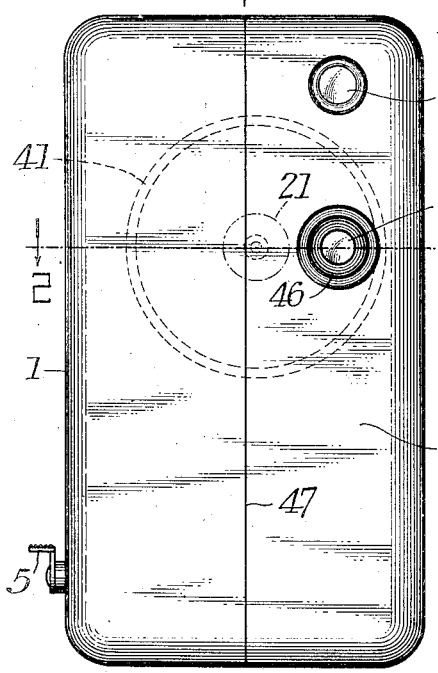
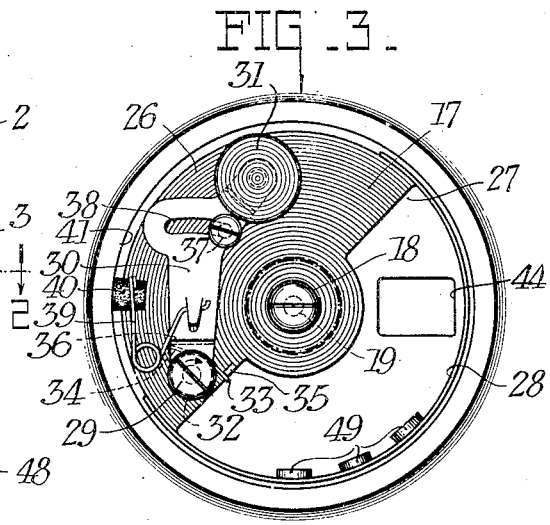
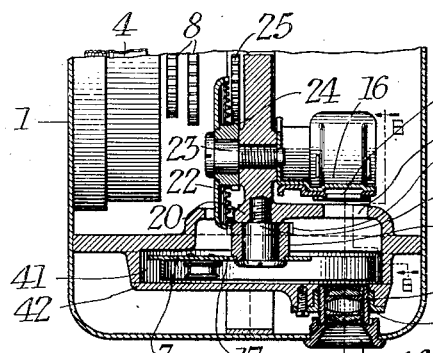
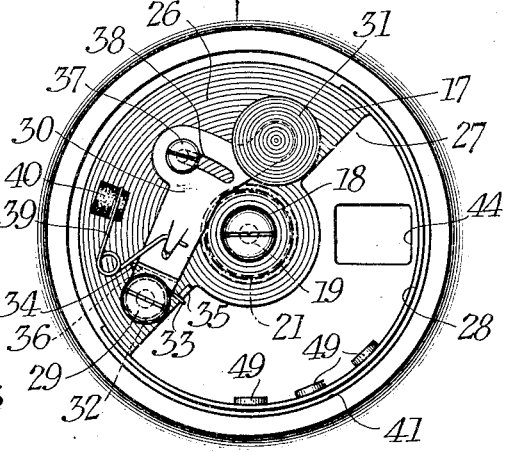
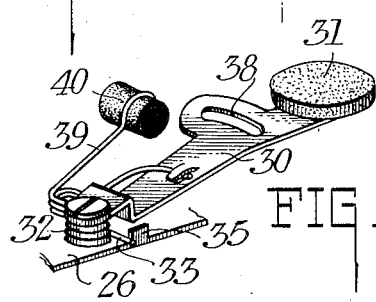
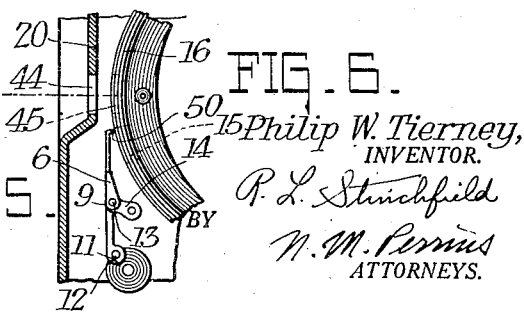
Philip W. Tierney,
INVENTOR.
R. L. Stinchfield
N. M. Perrins
ATTORNEYS.

Patented Mar. 6, 1928.

1,661,741

UNITED STATES PATENT OFFICE.

PHILIP W. TIERNEY, OF ROCHESTER, NEW YORK, ASSIGNOR TO EASTMAN KODAK COMPANY, OF ROCHESTER, NEW YORK, A CORPORATION OF NEW YORK.

SPEED CONTROL FOR MOTION-PICTURE APPARATUS.

Application filed January 3, 1925. Serial No. 425.

This invention relates to the speed control of motion picture apparatus. As is well known it is desirable that such apparatus shall be operated at a standard speed, and when motor driven provision is usually made for this purpose. The object of the present invention is to provide a speed regulating device which is simple in construction and certain in operation, is applied directly to one of the operating parts and is not an entirely separate unit, and is compact, and easy to assemble, and inexpensive to manufacture. These and other objects are attained by mounting one of the braking or governing members upon the shutter itself. It thus does not require room for expanding parts in the body of the apparatus and is very accessible for assembly or repair.

Reference will now be made to the accompanying drawings, in the several figures of which the same reference characters refer to the same parts throughout, and in which:

Fig. 1 is a front view of a motion picture camera;

Fig. 2 is a section of the front part of the camera on line 2—2 of Fig. 1;

Fig. 3 is a view of the shutter assembly as the parts are positioned when driven at full speed;

Fig. 4 is a view of the shutter as the parts are positioned when at rest;

Fig. 5 is a perspective view of the governor or brake element alone;

Fig. 6 is a section on line 6—6 of Fig. 2.

My invention is shown as embodied in a small portable camera designed for use in the hand. It comprises a casing 1, with the usual finder lens 2 and objective 3. A spring motor 4, contained within the casing and operated by trigger 5, drives the pulldown mechanism 6 and shutter 7, by means of a suitable gear train 8. As shown the pulldown comprises a lever 9 pivoted at one end at 11 to a driven disc 12 and at an intermediate point 13 to a controlling link 14 and having at its other end a claw 50 that is moved through a slot 15 in the curved gate 16 to engage and advance the film. The ends of slot 15 are indicated in dotted lines in Fig. 6. The details of the pulldown are quite unimportant to the present invention, and this is true also of the gear train by which it is driven from the motor, it being necessary only that the pulldown and shutter be driven in proper synchronism.

The shutter is of the disc type and comprises a central disc 17 secured to and carried by hub 18 rotatable on stub shaft 19 removably supported on frame 20. The hub 18 has a gear ring 21 driven by a gear 22 on stub shaft 23 also carried by frame 20 and driven from the motor by gears 24, 25 and other members of the gear train 8, the details of which are unimportant. The shutter as shown has a single large flat sector blade 26 and a single large sector opening 27, around which is a rim or flange 28, which carries counterweights 49. Pivoted at 29 on the blade 26 is a flat member 30 with a weight 31 at its free end, and spring pressed toward the center of the shutter by coil spring 32 about the pivot, the ends of the springs 33 and 34 engaging abutments 35 and 36 on the shutter and member 30 respectively. The extent of movement of the member 30 is controlled by a screw 37 on blade 26 engaging the ends of slot 38 in member 30. Member 30 carries a spring support 39 which in turn carries resiliently a brake or pressure pad 40, which, when the member 30 is in its outermost position frictionally engages the inner surface of a cylindrical wall 41 surrounding the shutter and carried by the frame 20. A front removable cover 42 is carried by the wall 41 and this carries the mount 43 for objective 3, in line with a suitable window 44 in frame 20 and the exposure gate 45. A suitable cap or frame 46 fits removably over mount 43 and is carried by the part 48 of the casing 1 which is split at 47 so that the parts can be separated.

The operation of the governor is obvious and requires no further explanation. It is also apparent that the location and structure of the shutter and the governor elements carried render them particularly accessible and compact, qualities that are most desirable in a portable, hand held camera.

It is to be understood that the embodiment here disclosed is by way of example and that I contemplate as within the scope of my invention all such modification and equivalents as fall within the scope of the appended claims.

Having thus described my invention, what I claim as new and desire to secure by Letters Patent is:

1. In motion picture apparatus, motor driven mechanism including a rotatable shutter, and a speed operated governor carried by said shutter and operative on said mechanism to control the speed of said mechanism.

2. In motion picture apparatus, mechanism comprising means for advancing film through the apparatus, a rotatable shutter and a motor for driving said means and shutter, and a governor carried by the shutter and operative on said mechanism to control the speed of said mechanism.

3. In motion picture apparatus, mechanism comprising means for advancing film through the apparatus, a rotatable shutter and a motor connected to said means and shutter for driving them in timed relation, a cylindrical wall around said shutter and a centrifugally operated brake carried by said shutter and adapted to contact said wall to control the speed of said mechanism.

4. In motion picture apparatus, a rotatable shutter, a cylindrical wall surrounding said shutter, a brake member carried by said shutter and spring pressed toward the axis of the shutter but movable by centrifugal force toward the cylinder to contact therewith and thereby control the speed of rotation of the shutter.

5. In motion picture apparatus, motor driven mechanism including a rotatable shutter, a cylindrical wall surrounding said shutter, a weighted member pivoted to the shutter eccentrically thereof and spring pressed toward the axis of the shutter but movable by centrifugal force away from the axis, and a pressure pad carried by the weighted member and adapted to contact the wall and thereby control the speed of rotation of the shutter and mechanism.

6. In motion picture apparatus, a rotatable shutter of the disc type, a flat member carried by the shutter and spring pressed toward its axis, a weight carried by the flat member whereby it may be moved outwardly by centrifugal force, a pressure pad carried by said flat member, and a cylindrical wall surrounding the periphery of the shutter against which said pressure pad will contact when the shutter rotates at a high speed.

7. In motion picture apparatus, motor driven mechanism including a rotatable shutter of the disc type, a cylindrical wall around the periphery of the shutter, a weighted flat member pivoted to the shutter and spring pressed toward the axis thereof, but movable by centrifugal force away from the axis, and a pressure member resiliently carried by said flat member and adapted to be pressed against said wall when the shutter rotates at high speed.

8. In motion picture apparatus, a film exposure gate, motor driven mechanism including a rotatable shutter in front of the gate, and a speed governor carried on the front of the shutter and operative on the mechanism to control the speed thereof.

9. In motion picture apparatus, a fixed frame having an exposure window, a shutter mounted to rotate before said window, a cylindrical wall on said frame surrounding said window and shutter, and a centrifugally operated brake carried by said shutter and adapted to contact said wall when the shutter is rotated.

10. In motion picture apparatus, a fixed frame having an exposure window, mechanism comprising means for advancing film past the window, a shutter rotatable in front of the window and a motor for operating the film advancing means and the shutter in timed relation and governor means operative on said mechanism for controlling the speed of the mechanism and carried on the front surface of the shutter.

11. In motion picture apparatus, a fixed frame having an exposure window, mechanism comprising means for advancing film past the window, a shutter mounted to rotate in front of the window and a motor for operating the film advancing means and the shutter in timed relation, a cylindrical wall on the frame and surrounding the window and shutter and a centrifugally operated brake member carried by the shutter and adapted to contact the wall and control the speed of the mechanism when the mechanism is operated.

12. In motion picture apparatus, a fixed frame having an exposure window, mechanism comprising means for advancing film past the window, a shutter of the disc type mounted to rotate in front of the window, and a motor for operating the film advancing means and shutter in timed relation, a cylindrical wall on the frame and surrounding the window and shutter and a flat, weighted member carried by the shutter and having a pressure pad and movable under centrifugal force to press the pressure pad against the wall, whereby the speed of the mechanism may be controlled.

Signed at Rochester, New York, this 30th day of December 1924.

PHILIP W. TIERNEY.